United States Patent

Fischinger et al.

[11] Patent Number: 5,533,704
[45] Date of Patent: Jul. 9, 1996

[54] HOLDER FOR AN ELECTRIC MOTOR, ESPECIALLY FOR A FAN OF A HEATER OF AIR CONDITIONER

[75] Inventors: Claus-Dieter Fischinger, Calw-Heumaden; Adem Hizli, Stuttgart; Wolfgang Rose, Weissach; Heinrich Waldmann, Stuttgart, all of Germany

[73] Assignee: Behr GmbH & Co., Stuttgart, Germany

[21] Appl. No.: 301,049

[22] Filed: Sep. 6, 1994

[30] Foreign Application Priority Data

Sep. 3, 1993 [DE] Germany ............... 43 29 804.4

[51] Int. Cl.⁶ .................................................. F16M 13/00
[52] U.S. Cl. .................................. 248/603; 248/675
[58] Field of Search ................................. 248/603, 674, 248/675, 638, 605; 310/91

[56] References Cited

U.S. PATENT DOCUMENTS

| | | | |
|---|---|---|---|
| 2,451,970 | 10/1948 | Odor | 248/603 |
| 3,620,644 | 11/1971 | McLarty | 248/674 X |
| 3,773,285 | 11/1993 | Morrill | 248/603 |
| 3,830,595 | 8/1974 | Carpenter | 248/603 X |
| 4,161,667 | 7/1979 | Buckman | 310/91 X |
| 4,572,472 | 2/1986 | Eder | 248/605 |
| 4,805,868 | 2/1989 | Claude | 248/638 X |
| 4,849,667 | 7/1989 | Morrill | 248/675 X |
| 5,126,607 | 6/1992 | Merriman | 310/91 X |

FOREIGN PATENT DOCUMENTS

| | | |
|---|---|---|
| 0545003 | 6/1993 | European Pat. Off. . |
| 1208695 | 2/1960 | France ................... 248/603 |
| 1521494 | 4/1968 | France . |
| 2568732 | 2/1986 | France . |
| 1870497 | 2/1963 | Germany . |
| 91087457 | 12/1992 | Germany . |
| 1817193 | 5/1993 | U.S.S.R. . |

Primary Examiner—J. Franklin Foss
Attorney, Agent, or Firm—Evenson McKeown Edwards & Lenahan

[57] ABSTRACT

A mounting for an electric motor is provided for an electric motor having a fan wheel of a heating or air conditioning system of a motor vehicle. A plurality of support elements made of rubber-elastic material are disposed around the circumference of a pole ring of the electric motor. The support elements are arranged between an adapter and a motor mount. The adapter can be attached to the electric motor so that it is fixed in at least the axial direction and the support elements are positively connected with the motor mount at least in the axial direction.

20 Claims, 2 Drawing Sheets

HOLDER FOR AN ELECTRIC MOTOR, ESPECIALLY FOR A FAN OF A HEATER OF AIR CONDITIONER

BACKGROUND AND SUMMARY OF THE INVENTION

The invention relates to a mounting for an electric motor, particularly for an electric motor for a fan wheel of a heating or air-conditioning system of a motor vehicle, having a plurality of support elements made of a rubber-elastic material which are disposed distributed along the circumference of a pole ring of the electric motor.

In order to achieve the decoupling of oscillations and in this way to prevent the creation of noise on a housing or a vehicle, it is known (European Patent Publication EP 0 545 003 A2) to dispose strip-shaped rubber-elastic materials between the pole ring of an electric motor and a motor mount. In an exemplary embodiment, these rubber-elastic elements are positively connected with the motor mount. To secure the electric motor in the axial direction, this embodiment provides that the pole ring is equipped with one or a plurality of recesses which are engaged by button-shaped projections of the strip-shaped support means. In another exemplary embodiment it is provided that the motor mount is connected with the support bracket of the electric motor and that rubber-elastic materials are placed between them.

It is an object of the invention to provide a mount of the type mentioned at the outset which will result in an improved decoupling of oscillations.

This object is attained according to preferred embodiments of the invention in that the support elements are disposed between an adapter, which can be attached to the electric motor so that it is fixed in place at least in the axial direction, and a motor mount, and in that the support elements are positively connected with the motor mount at least in the axial direction.

A multi-piece mount into which the rubber-elastic support elements are integrated is created by means of an embodiment of the invention. The rubber-elastic elements do not directly act on the electric motor. Instead, the latter is received in the adapter of the mount, which can maintain the electric motor securely in the axial direction without it being necessary to make any changes, in particular to the pole ring.

In further embodiments of the invention it is provided that the support elements have an axial length approximately corresponding to between a third to a fourth of the axial length of the pole ring. In a practical manner it is further provided that the support elements are disposed in a common radial plane. In a preferred attainment of the object it is provided that the radial plane extends at least approximately through the axial center of the unit comprised of the electric motor and the element driven by it, in particular a fan wheel. Because of this arrangement, the components comprising the electric motor and the driven element (fan wheel) can oscillate freely around their center, since the support elements allow these movements, without the oscillations being transmitted via the motor mount to a housing or the vehicle.

In connection with a structurally advantageous embodiment it is provided that the adapter and the motor mount can be inserted into each other in the axial direction, wherein the support elements disposed on the adapter enter receivers of the motor mount and are locked therein. A very simple assembly of the mounting results from this embodiment.

It is provided in an advantageous further embodiment that the fingers are provided on their exterior with respective projections which engage recesses of a support element. A positive connection between the adapter and the support elements is realized by means of this arrangement.

In a further embodiment of the invention it is provided that the motor is equipped with axially limited receivers which enclose a support element in a shell-shaped manner. These receivers, together with recesses for the locking projections of the support elements, result in a positive connection between the motor mount and the support elements.

In connection with a first embodiment of the invention it is provided that the adapter has a ring which encloses a front end of the pole ring and is provided with a plurality of fingers extending along generating lines of the pole ring and enclosing the other front end of the pole ring by means of locking projections, with support elements disposed on the fingers. The elastic fingers of this adapter make it possible to compensate for diameter tolerances of the pole rings of the electric motor.

In a further embodiment of the invention it is provided that the adapter essentially consists of a plurality of fingers extending along the generating lines of the pole ring of the electric motor, which are connected with each other by means of a strut extending transversely in respect to the motor shaft. This adapter can be applied to the electric motor without having to remove the fan wheel from the electric motor. Because of this, it is possible to balance the electric motor together with the fan wheel and to apply the adapter only later. With this embodiment no closed ring is pushed over the pole ring, so that this adapter is also suitable for electric motors with connecting elements or circuit elements projecting beyond the circumference of the pole ring. In an advantageous further embodiment it is provided that the adapter is a stamped and bent preformed sheet metal part. This preformed sheet metal part which can be manufactured in particular from aluminum also results in the advantage that heat removal from the pole ring of the electric motor is improved.

It is provided in a further embodiment that at their ends facing away from the strut the fingers of the adapter make a transition into a ring surrounding the pole ring of the electric motor. This adapter can be advantageously manufactured as a preformed plastic part. In this case the additional ring acts as a spring element keeping the fingers apart, so that the adapter can be easily pushed on the pole ring.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
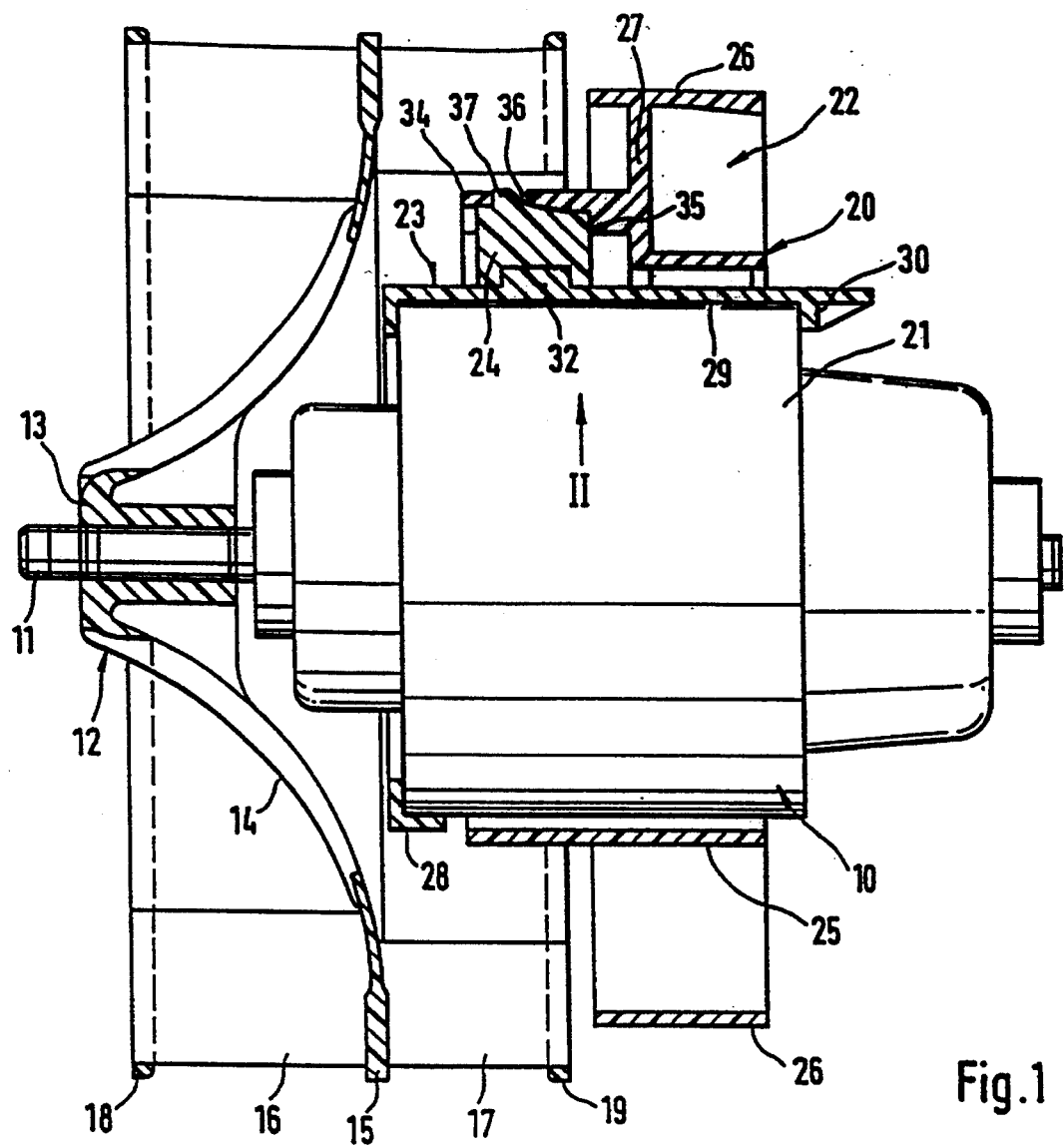
FIG. 1 is an axial part sectional view through an electric motor of a fan wheel with a mounting constructed in accordance with a preferred embodiment the invention.
Figure 2:
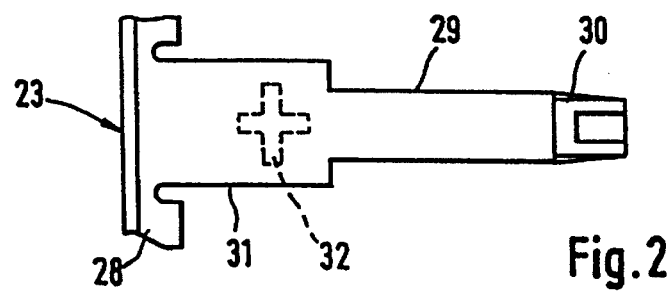
FIG. 2 is a partial plan view taken in the direction of the arrow II of FIG. 1 and showing a detail of the adapter of the mounting.

The electric motor 10 illustrated in FIG. 1 supports a fan wheel 12, made in the form of a one-piece injection-molded preformed part, on its shaft 11. The fan wheel 12 consists of a hub 13, which is connected by means of curved spokes 14 with a ring 15, from both sides of which project fan blades 16, 17 which are curved in the axial direction. On their ends, the fan blades are reinforced on the outside with circular support rings 18, 19. The electric motor 10 is partially disposed inside the fan wheel 12 because of the curved path of the spokes 14.

To be able to mount the electric motor 10 with the fan wheel 12 on a housing or another component of a vehicle, a mounting is provided which holds the electric motor 10 by its pole ring 21. A plurality of rubber-elastic support elements 24, which decouple the unit consisting of the electric motor 10 and the fan wheel 12 in respect to oscillations of the components to which they are attached, are integrated into the mounting made of two parts, namely a motor mount 22 and an adapter 23.

The motor mount 22 has two essentially concentric rings 25, 26, which are connected with each other at angular distances of 120° via bars 27. The outer ring 26 is provided with a plurality of tongues, not shown, which have fastening means, for example passages for screws.

Figure 3:
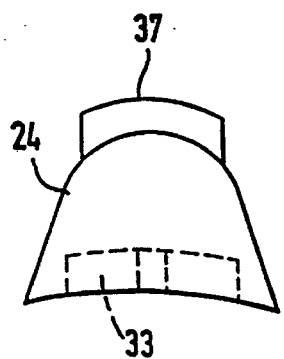
FIG. 3 is an axial view of a block-shaped support element of a rubber-elastic material of the FIG. 1 embodiment, shown in an enlarged scale.

The support elements 24 of rubber-elastic material are arranged between the adapter 23 and the motor mount 22. They have an axial length which approximately corresponds to between a third to a fourth of the axial length of the pole ring 21. Their thickness in the radial direction approximately corresponds to between two-thirds to three-quarters of their axial length. As can be seen in FIG. 3, in an axial view they have an approximately trapezoidal shape, wherein the base resting on the adapter 23 has a width which approximately corresponds to the axial length. The support elements 24, which in the exemplary embodiment are arranged at angular distances of 120° around the circumference of motor 10, are located in a common radial plane which at least approximately extends through the center of the component consisting of the electric motor 10 and the fan wheel 12. Because of this arrangement, the component can oscillate around its center, wherein the oscillation movements are damped by means of the support elements 24.

The adapter 23 has a ring which is angular in cross section and encloses a front end of the pole ring 21 of the electric motor 10. Fingers 29 project away from this ring 28 and extend along the generating lines of the pole ring 21 and are provided with a locking projection 30, which encloses the oppositely located front end of the pole ring 21. The fingers 29 of the adapter 23, which is elastically made of plastic, are elastically movable in the radial direction in respect to the pole ring 21, so that possibly occurring diameter differences in respect to the pole ring 21 are compensated. The fingers 29, adapted to the exterior contour of the pole ring 21 by a curvature, have a widened section 31 on the side of which facing away from the pole ring 21 a cross-shaped projection 32 is provided. The rubber-elastic support elements have a correspondingly cross-shaped recess 33, by means of which they are slipped on a respective projection 32. In this way the support elements 24 are positively connected with the adapter 23 in the axial direction as well as the circumferential direction. Furthermore, their position is clearly defined.

The motor mount 22 has shell-shaped receivers 34 which interrupt the inner ring 25 and the number of which corresponds to the number of block-shaped support elements 24. These shell-shaped receivers 34, which enclose the support elements 24 in the circumferential direction, are limited by an axial stop face 35. Each is furthermore provided with a recess 36 which is engaged by a locking projection 37 of the support elements 24. On their side facing the stop face 35, the locking projections 37 have a slope of approximately 45°. The opposite surface extends radially. The interior contour of the shell-shaped receivers 34 slightly tapers in the direction of the axial stop face 35, for example at an angle of approximately 5°. The support elements 24 have a corresponding contour.

During assembly, first the recesses 33 of the support elements 24 are slipped on the projections 32 of the fingers 29 of the adapter 23. Then the adapter 23 together with the support elements 24 is inserted into the motor mount 22 in the axial direction. The support elements 24 have slightly larger dimensions, so that they are already being slightly elastically deformed. The support elements 24 are sufficiently compressed in the axial direction so that the locking projections 37 are locked in the recesses 36.

As a rule it will be practical to pre-assemble the entire mounting 20 first and then to slip the adapter 23 on the pole ring 21 of the electric motor. In this case, during pre-assembly, the fingers 29 can yield in the radial direction when the adapter 23 is inserted into the motor mount 22. However, it is also possible to first mount the adapter 23 on the pole ring 21 of the electric motor 10 and to attach the support elements 24 thereafter and then to slip on the motor mount 22.

In the illustrated embodiment, the ring enclosing a front face of the pole ring 21 is located on the side facing the fan wheel 12, while the locking projections 30 are arranged on the opposite side. In contrast thereto it is provided in a variant embodiment that the positions of the locking projections 30 and the ring 28 are interchanged, i.e. that the locking projections 30 are assigned to the front end of the pole ring 21 which faces the fan wheel 12.

In the exemplary embodiment, the mounting 20 contains three support elements 24 disposed at an angular distance of 120°. It is of course also contemplated to provide a larger number of support elements 24 in certain embodiments, in which case the adapter 23 and the motor mount 22 must be designed accordingly. In the same way it is possible to provide one annularly circulating support element in place of a plurality of support elements 24.

To connect the adapter 23 positively in the circumferential direction with the pole ring 21 of the electric motor, a variant embodiment provides that one front end of the pole ring 21 is provided with notches which are engaged by the locking projections 30 of the fingers 29.

In a further variant embodiment, the rubber-elastic support elements 24 are injection-molded on the adapter 23. Because in the process the material of the support elements can penetrate into the pore-like openings of the surface of the adapter 23 and additionally adheres to this surface, it may be possible to forego the projections 32 on the fingers 29 of the adapter 23.

Figure 4:
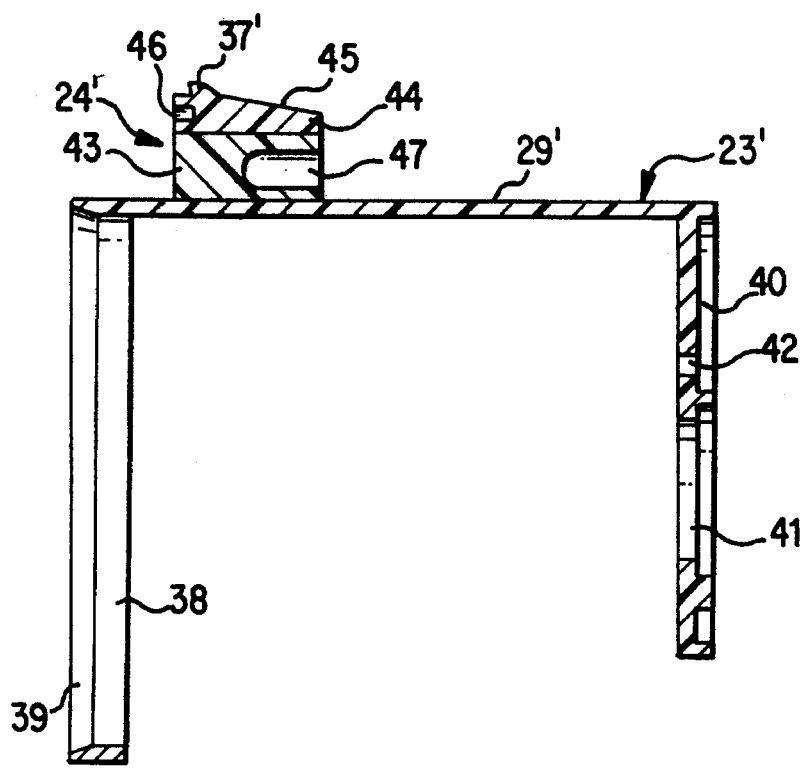
FIG. 4 is an axial sectional view of a variation of an adapter with support elements constructed according to another prefaced embodiment of the invention.

The adapter 23' illustrated in FIG. 4 essentially consists of three fingers 29' disposed at angular distances of 120°, which are connected with each other at their end facing the fan wheel 12, not shown, by means of a ring 38, which acts as a sort of spring and keeps the fingers 29' apart in this area. The ring 38, the front end of which is provided with a bezel 39, encloses the pole ring 21 of the electric motor 10, not shown. At their end located opposite the ring 38, the fingers 29' are connected with each other by means of a plate-like strut 40 extending transversely to the shaft of the electric motor 10. This strut 40 has a centered cutout 41 for the passage of the motor shaft and/or a bearing of the motor shaft. The strut 40 is furthermore provided with one or two receivers 42 into which fastening means, particularly screws, can be inserted, with which the adapter can be fastened to the end plate, in particular, of the electric motor. In this way the adapter 23' is fixed in the axial direction and the circumferential direction on the electric motor 10, not shown. The adapter 23', manufactured as a preformed plastic part, can be pushed from the side opposite the fan wheel 12 onto the pole ring 21 of the electric motor, so that it can be attached after the fan wheel 12 has already been fixed on the motor shaft 11 and has been balanced.

Support elements 24' have respectively been placed on the fingers 29' and are glued to or vulcanized on the fingers 29'. The support elements 24' consist of a rubber-elastic base body 43 provided with a slide element 44 assigned to the motor mount 22. The slide element 44 is made of a harder plastic. It is provided with a slope 45 and a locking projection 37' which is assigned to one of the shell-shaped receivers 34 of the motor mount 22. Since the slide element 44 is made of a non-rubber-elastic material, only the base body 43 of elastic material is deformed when the electric motor 10 provided with the adapter 23' is inserted into the motor mount 22. Insertion is considerably eased in this way since it only requires a relatively small expenditure of force. In addition it is possible to act on the slide element 44 by means of a tool during insertion and to push it into the motor mount 22. For this purpose it has been provided in the exemplary embodiment that the slide element 44 is provided with a receiver 46 for a tool. The slide element 44 is glued to the rubber-elastic base body 43 or is vulcanized on it. The rubber-elastic base body 43 has a cutout 47 in the area of the slope 45, so that in this area its resistance to deformation is especially low and insertion is further eased in this way.

Figure 5:
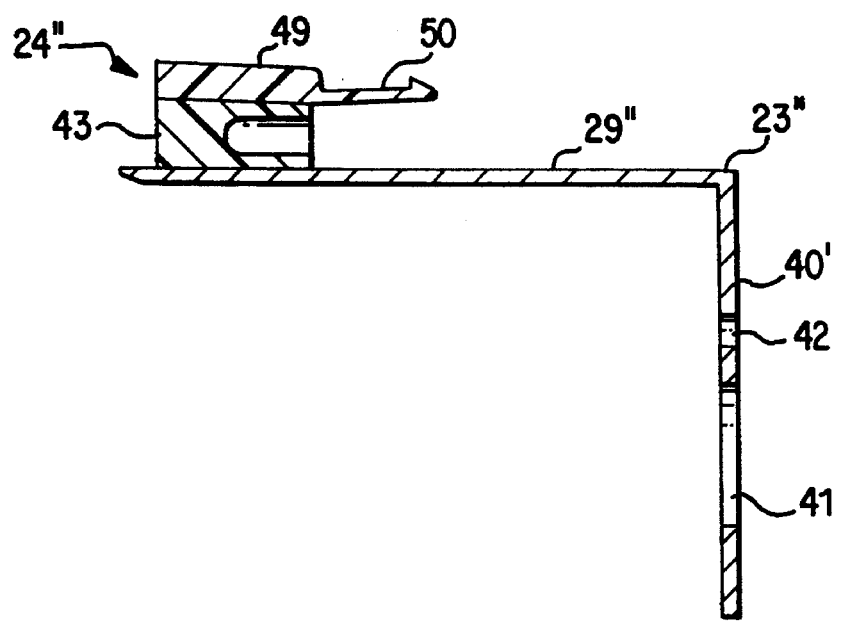
FIG. 5 is an axial section of a further exemplary embodiment of an adapter constructed according to the invention.

In the exemplary embodiment in accordance with FIG. 5, the adapter 23" essentially only consists of fingers 29" extending along the generating lines of the pole ring of the electric motor 10, not shown. These fingers 29" are connected at their end facing away from the fan wheel, not shown, by means of a strut 40' with a central opening 41 and receivers 42 for fastening means. Because the fingers 29" are not connected with each other in the area facing the fan wheel 12, this adapter is also suitable for installation on an electric motor provided with elements extending beyond the circumference of the pole ring.

In a preferred embodiment, the adapter 23" in accordance with FIG. 5 is manufactured as a stamped and canted sheet metal part, in particular as a sheet metal part of aluminum. Such a sheet metal part has the advantage that in addition it is suitable for removing heat from the electric motor.

The fingers 29" of the adapter 23" of the exemplary embodiment of FIG. 5 are also provided with two-part support elements 24", which consist of a base body 43 of a rubber-elastic material, on which a slide element 49 associated with the motor mount is attached. This slide element 49 is provided with hook-shaped locking tongues 50, which enclose a correspondingly formed projection of the motor mount, not shown, and in this way provide a positive connection with the motor mount.

In most uses it is required that the electric motor be disposed in the motor mount in a defined angled position, for example for keeping the electrical connecting binders in a predetermined position. To assure this correct angular position, it is possible to provide a projection on one of the fingers 29, 29', 29" which is associated with a cutout in the motor mount 22. This cutout of the motor mount 22 is of such dimensions that following installation there is no direct connection between the projection of the adapter 23, 23', 23" and the motor mount 22.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A mounting for an electric motor, particularly for an electric motor for a fan wheel of a heating or air-conditioning system of a motor vehicle, having a plurality of support elements made of a rubber-elastic material which are disposed distributed along the circumference of a pole ring of the electric motor, wherein the support elements are arranged between a motor mount and an adapter, which adapter can be attached to an electric motor by axially sliding the adapter over the pole ring so that it is fixed in at least the axial direction by abutment between one end of the pole ring and an annular stop of the adapter, and wherein the support elements are positively connected with the motor mount at least in the axial direction.

2. A mounting in accordance with claim 1, wherein the support element are positively connected with the motor mount in the circumferential direction.

3. A mounting for an electric motor, particularly for an electric motor for a fan wheel of a heating or air-conditioning system of a motor vehicle, having a plurality of support elements made of a rubber-elastic material which are disposed distributed along the circumference of a pole ring of the electric motor, wherein the support elements are arranged between an adapter and a motor mount, which adapter can be attached to an electric motor so that it is fixed in at least the axial direction, wherein the support elements are positively connected with the motor mount at least in the axial direction, and wherein the support elements have an axial length corresponding to between a third to approximately a fourth of the axial length of the pole ring.

4. A mounting in accordance with claim 1, wherein the supporting elements are disposed in a common radial plane.

5. A mounting in accordance with claim 4, wherein the radial plane at least approximately extends through an axial center of the unit consisting of the electric motor and the element driven by it, particularly a fan wheel.

6. A mounting in accordance with claim 3, wherein the radial thickness of the support elements corresponds to between two-thirds to three-quarters of their axial length.

7. A mounting in accordance with claim 1, wherein the adapter and the motor mount can be inserted into each other in the axial direction, in the course of which the support elements disposed on the adapter penetrate receivers of the motor mount and are locked therein.

8. A mounting in accordance with claim 1, wherein the motor mount is provided with axially limited receivers which enclose a support element in a shell-like manner.

9. A mounting in accordance with claim 1, wherein the support elements respectively engage recesses of a receiver by means of locking projections which project away approximately radially.

10. A mounting for an electric motor, particularly for an electric motor for a fan wheel of a heating or air-conditioning system of a motor vehicle, having a plurality of support elements made of a rubber-elastic material which are disposed distributed along the circumference of a pole ring of the electric motor, wherein the support elements are arranged between an adapter and a motor mount, which adapter can be attached to an electric motor so that it is fixed in at least the axial direction, wherein the support elements are positively connected with the motor mount at least in the axial direction, and wherein the support elements have a rubber-elastic base body which is provided with a sliding element associated with the mount.

11. A mounting in accordance with claim 10, wherein the sliding element has an inclined slope and a locking projection.

12. A mounting for an electric motor, particularly for an electric motor for a fan wheel of a heating or air-conditioning system of a motor vehicle, having a plurality of support elements made of a rubber-elastic material which are disposed distributed along the circumference of a pole ring of the electric motor, wherein the support elements are arranged between an adapter and a motor mount, which adapter can be attached to an electric motor so that it is fixed in at least the axial direction, wherein the support elements are positively connected with the motor mount at least in the axial direction, and wherein the adapter has a ring enclosing one end face of the pole ring, which adapter is provided with a plurality of fingers extending along generating lines of the pole ring and having locking projections which enclose the other end face of the pole ring, on which the support elements being disposed on the adapter.

13. A mounting for an electric motor, particularly for an electric motor for a fan wheel of a heating or air-conditioning system of a motor vehicle, having a plurality of support elements made of a rubber-elastic material which are disposed distributed along the circumference of a pole ring of the electric motor, wherein the support elements are arranged between an adapter and a motor mount, which adapter can be attached to an electric motor so that it is fixed in at least the axial direction, wherein the support elements are positively connected with the motor mount at least in the axial direction, and wherein the adapter essentially consists of a plurality of fingers extending along generating lines of the pole ring of the electric motor, which fingers are connected with each other by means of a strut extending transversely to the motor shaft.

14. A mounting in accordance with claim 13, wherein the strut has at least one receiver for a fastening means.

15. A mounting in accordance with claim 13, wherein the adapter is a stamped and bent preformed sheet metal part.

16. A mounting in accordance with claim 13, wherein, at their ends facing away from the strut, the fingers of the adapter make a transition into a ring enclosing the pole ring of the electric motor.

17. A mounting in accordance with claim 16, wherein the adapter is a preformed plastic part.

18. A mounting in accordance with claim 5, wherein the support elements have an axial length corresponding to between a third to approximately a fourth of the axial length of the pole ring.

19. A mounting in accordance with claim 18, wherein the radial thickness of the support elements corresponds to between two-thirds to three-quarters of their axial length.

20. A mounting in accordance with claim 19, wherein the adapter and the motor mount can be inserted into each other in the axial direction, in the course of which the support elements disposed on the adapter penetrate receivers of the motor mount and are locked therein.

* * * * *